(No Model.)

J. A. KELLER.
FRICTION CLUTCH.

No. 380,326. Patented Apr. 3, 1888.

Witnesses:
J. W. Snyder
W. A. Seward

John. A. Keller. Inventor.
by James N. See.
Attorney.

UNITED STATES PATENT OFFICE.

JOHN A. KELLER, OF HAMILTON, ASSIGNOR TO THE FALLS RIVET COMPANY, OF CUYAHOGA FALLS, OHIO.

FRICTION-CLUTCH.

SPECIFICATION forming part of Letters Patent No. 380,326, dated April 3, 1888.

Application filed December 19, 1887. Serial No. 258,292. (No model.)

*To all whom it may concern:*

Be it known that I, JOHN A. KELLER, of Hamilton, Butler county, Ohio, have invented certain new and useful Improvements in Friction-Clutches, of which the following is a specification.

This invention pertains to friction-clutches, and relates particularly to improvements in the mechanism by which the frictional surfaces are brought into forcible contact.

My improvements will be readily understood from the following description, taken in connection with the accompanying drawings, in which—

Figure 1:
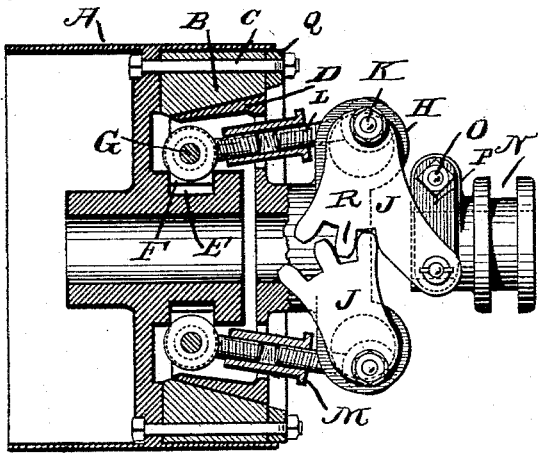
Figure 2:
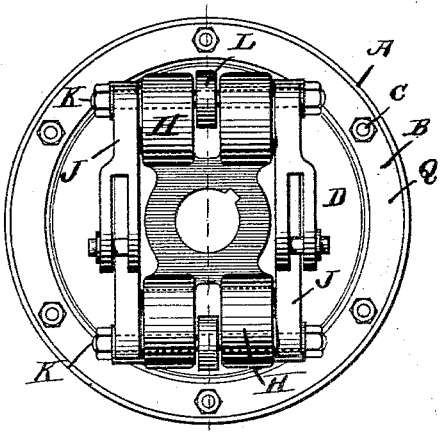
Figure 3:
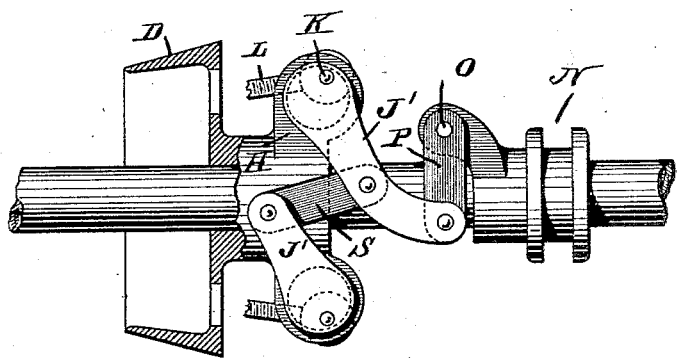
Figure 4:
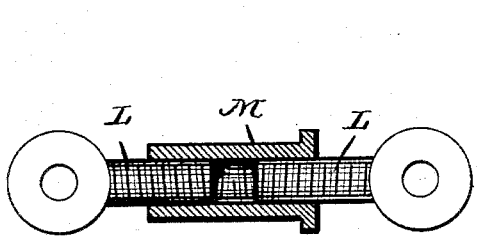
Figure 5:
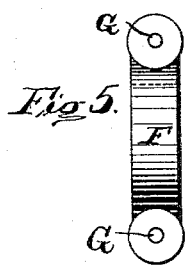
Figure 6:
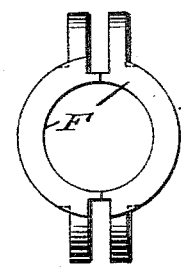

Figure 1 is a vertical longitudinal section of a friction-clutch, illustrating my improvements as applied to a clutch of the male and female cone order, sometimes referred to as "pan-clutches;" Fig. 2, a face view of the same; Fig. 3, an elevation, part section, of the same with the pulley portion omitted, this view illustrating also a modification of means for causing the levers J to move in unison; Fig. 4, an enlarged elevation of one of the pairs of eyebolts, their adjusting-nut appearing in diametrical section; Fig. 5, a side elevation of the pivot-ring F, and Fig. 6 a face view of the same.

In the drawings, A represents a pulley intended, normally, for free rotation upon its shaft; B, a conically-bored rim-bushing for the same, the bore of this bushing forming one of the frictional surfaces through which the driving of the pulley is to be effected; C, bolts by which the rim-bushing is secured to the pulley; D, a cone adapted to closely fit the rim-bushing and provided with a hub intended to be rigidly secured to the shaft; E, a circumferential groove in the hub of the pulley; F, a pivot-ring engaging this groove, this ring being formed in halves to permit of its application to the groove and having outwardly-projecting lugs for the support of pivots at right angles to the axis of the shaft; G, two pivots supported by this pivot-ring at diametrically-opposite points; H, pivot-lugs projecting outwardly and oppositely from the hub of the cone D; J in Figs. 1 and 2 and J' in Fig. 3, levers having their hubs journaled in the pivot-lugs H, there being two pairs of these levers—a pair to each side of the shaft; K, pivot-pins passing through the hubs of the levers J eccentric to these hubs; L, two pairs of eyebolts engaging the pivots G and pivot-pins K; M, adjusting-nuts—one for each pair of eyebolts—these nuts engaging right and left hand threads upon the eyebolts, whereby the length of the eyebolts from pivot-center to pivot-center may be adjusted; N, a collar fitted for sliding movement upon the shaft and intended to be operated by any of the usual forms of shifters, this collar being provided with a pivot-supporting lug; O, a pivot supported by this lug; P, links engaging the pivot O and one of each pair of levers J; Q, a washer-ring at the outer face of the rim-bushing B; R in Fig. 1, toothed segments upon the levers J, through the medium of which any motion imparted to the levers with which the links P connect will be simultaneously imparted to the other levers, whereby all of the lever-hubs become rotated simultaneously and equally; and S in Fig. 3, links connecting the pairs of levers J' and serving as a substitute for the segmental gearing R.

It is obvious that if the pairs of levers J be oscillated the pivot-pins K, being eccentrically disposed, will be moved to or from the cone D. The eyebolts engage these pivot-pins, and the other ends of the eyebolts engage the pivots G, which are virtually supported by the pulleys. It follows that the partial rotation of the eccentric hubs of the levers will serve in forcibly drawing the friction-surfaces together. When this is done, the pulley and the cone D will revolve together. If the friction-surfaces be relieved from forcible contact, the pulley will become disengaged from the cone D. Under the latter conditions the pulley-hub must revolve within the pivot-ring; but under these conditions there are no strains upon the pivot-ring, and consequently no serious friction. A shifting of the sliding collar N serves to give simultaneous motion to the lever-hubs through the medium of the link P. When these links are in the position indicated in Figs. 1 and 3, the clutching engagement is held secure and there are no rubbing-surfaces subjected to friction by reason of the locking strains. The adjusting-nuts M serve in adjusting the practical length of the eyebolts, so as to insure that each of the pivot-pins K is doing its proper amount of work.

The pulley A may of course be a gear, and the intermembering friction-surfaces, instead of being arranged conically, as illustrated, may make direct contact by flat faces, the flat arrangement and the conical arrangement being both common in friction-clutches.

I claim as my invention—

1. In clutch-operating mechanism, the combination, with a pulley provided with a friction-surface and having a circumferentially-grooved hub, of a part, as a cone, provided with another friction-surface and having pivot-lugs, a pivot-ring set in the groove of the pulley-hub, pivots supported by said pivot-ring, levers connected for simultaneous motion and pivoted to said lugs, pivot-pins eccentrically carried by said levers, connections, as eyebolts L, engaging said pivot-pins and the pivots of said pivot-ring, a sliding collar adapted to be moved by a shifter, and a link pivoted to said sliding collar and connected with said levers, substantially as and for the purpose set forth.

2. In a friction-clutch, the combination, substantially as set forth, of pulley A, provided with hub-groove E, and a conically-bored rim-bushing, B, secured to the pulley, with a cone, D, adapted to fit said rim-bushing, and provided with a hub carrying lugs H, levers connected together and having their hubs journaled in said lugs, sliding collar N, carrying pivot O, link P, connecting said collar and levers, pivot-pins K, eccentrically carried by the hubs of the levers, pivot-ring F, engaging the hub-groove of the pulley and carrying pivots G, eyebolts L, engaging the pivot-pins K and pivots G, and adjusting-nuts M upon the eyebolts.

3. In mechanism for forcibly drawing together the two parts of a clutch, the combination of pivots carried by one of said parts, connected levers journaled in the other of said parts, pivot-pins eccentrically carried by said levers, connections, as eyebolts, engaging said pivot-pins and first-mentioned pivots, a sliding collar carrying a pivot, and a link engaging said sliding collar and one of said levers, substantially as and for the purpose set forth.

4. In mechanism for forcibly drawing together the two parts of a clutch, the combination of an eccentric pivot mounted in one of said parts, a connection, as eyebolts, from such eccentric pivot to a pivot supported by the other of said parts, a lever connected to such eccentric pivot, and mechanism, as a collar and link, for imparting motion to said lever, substantially as and for the purpose set forth.

JOHN A. KELLER.

Witnesses:
G. KAFFENBERGER,
W. A. SEWARD.